(12) United States Patent
Cadours et al.

(10) Patent No.: US 7,470,829 B2
(45) Date of Patent: Dec. 30, 2008

(54) METHOD FOR PROCESSING A NATURAL GAS WITH EXTRACTION OF THE SOLVENT CONTAINED IN THE PURIFIED NATURAL GAS

(75) Inventors: Renaud Cadours, Francheville (FR); Fabrice Lecomte, Paris (FR); Lionel Magna, Lyon (FR); Cécile Barrere-Tricca, Soucieu En Jarrest (FR)

(73) Assignee: Institut Francais du Petrole, Ruiel Malmaison Cedex (FR)

( * ) Notice: Subject to any disclaimer, the term of this patent is extended or adjusted under 35 U.S.C. 154(b) by 524 days.

(21) Appl. No.: 11/057,026

(22) Filed: Feb. 14, 2005

(65) Prior Publication Data
US 2005/0205468 A1    Sep. 22, 2005

(30) Foreign Application Priority Data
Feb. 13, 2004    (FR) .................. 04 01504

(51) Int. Cl.
*C07C 7/10*    (2006.01)
(52) U.S. Cl. ...................... 585/833; 208/189
(58) Field of Classification Search ............ 208/189; 585/833
See application file for complete search history.

(56) References Cited
U.S. PATENT DOCUMENTS

| | | | | |
|---|---|---|---|---|
| 3,793,187 A | * | 2/1974 | Marx et al. .................. 585/856 |
| 4,144,314 A | * | 3/1979 | Doerges et al. ............. 423/210 |
| 5,782,958 A | * | 7/1998 | Rojey et al. ................... 95/192 |
| 5,868,005 A | * | 2/1999 | Larue et al. ................... 62/625 |
| 6,290,754 B1 | * | 9/2001 | Peytavy et al. ............... 95/172 |
| 7,077,950 B2 | * | 7/2006 | Hommeltoft ................ 208/187 |
| 2002/0189444 A1 | | 12/2002 | Brennecke et al. |
| 2004/0133058 A1 | * | 7/2004 | Arlt et al. .................... 585/833 |

FOREIGN PATENT DOCUMENTS

| | | | |
|---|---|---|---|
| FR | 2 636 857 | | 3/1990 |
| FR | 2 743 083 | | 7/1997 |
| WO | WO 02034722 | * | 2/2002 |
| WO | WO 0226701 A2 | * | 4/2002 |
| WO | WO 02/34863 A1 | | 5/2002 |
| WO | WO 03/086605 A1 | | 10/2003 |
| WO | WO 03/086605 A2 | | 10/2003 |

* cited by examiner

*Primary Examiner*—Walter D Griffin
*Assistant Examiner*—Natasha Young
(74) *Attorney, Agent, or Firm*—Antonelli, Terry, Stout & Kraus, LLP.

(57) ABSTRACT

The natural gas arriving through pipe 1 is deacidified by being brought into contact with a solvent in column C2. The solvent charged with acid compounds is regenerated in zone R. The purified gas evacuated by pipe 9 includes some of the solvent. The method enables the solvent contained in the purified gas to be extracted. In zone ZA, the purified gas is brought into contact with a non-aqueous ionic liquid whose general formula is $Q^+ A^-$, where $Q^+$ designates an ammonium, phosphonium, and/or sulfonium cation, and $A^-$ designates an anion able to form a liquid salt. The solvent-impoverished purified gas is evacuated through pipe 17. The ionic liquid charged with solvent is regenerated by heating in an evaporator DE. The solvents separated from the ionic liquid in evaporator DE are recycled.

14 Claims, 1 Drawing Sheet

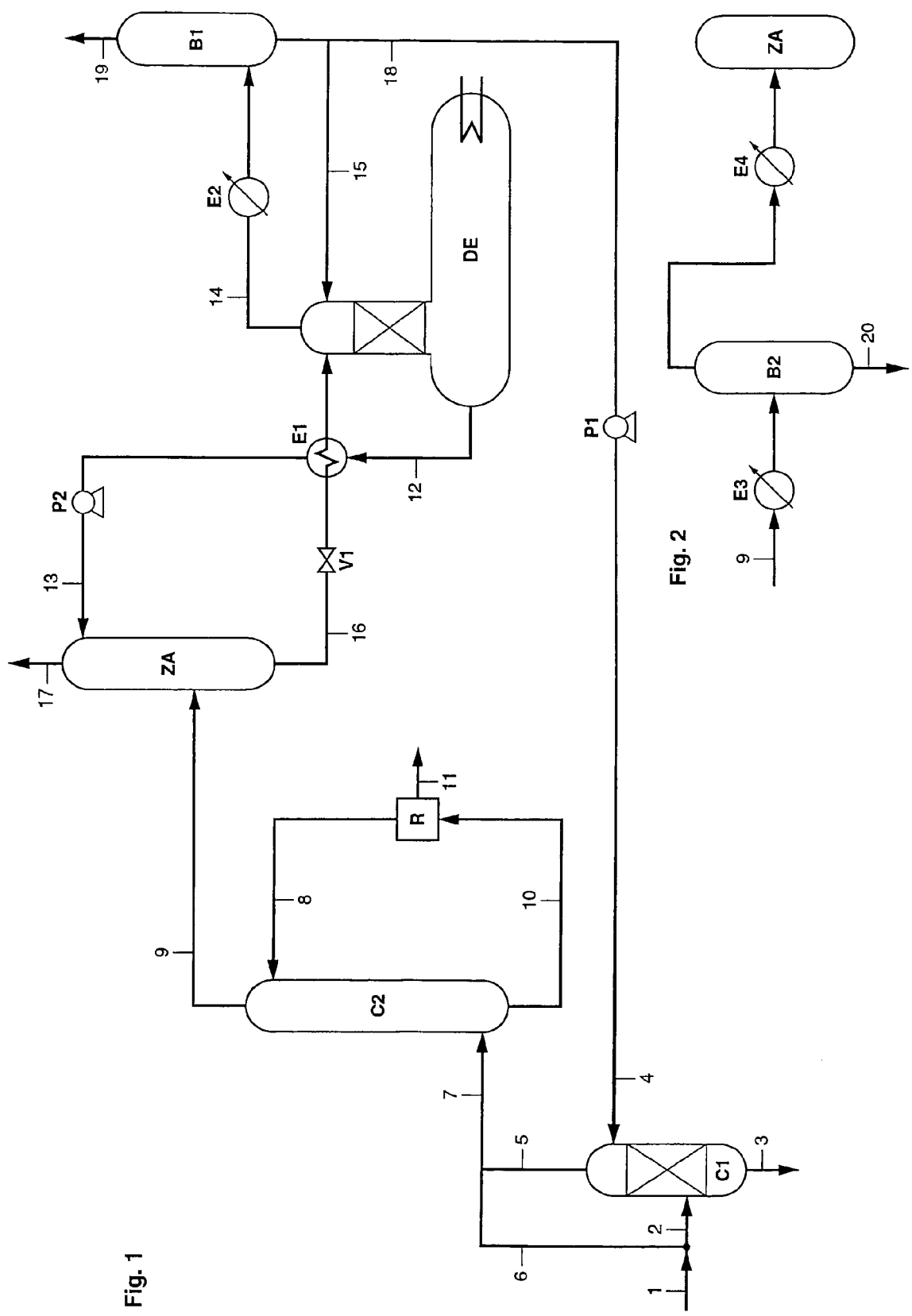

METHOD FOR PROCESSING A NATURAL GAS WITH EXTRACTION OF THE SOLVENT CONTAINED IN THE PURIFIED NATURAL GAS

The present invention relates to the area of natural gas processing. Specifically, the goal of the present invention is to extract the solvent contained in the purified natural gas following a deacidification treatment.

The main steps in processing a natural gas are deacidification, dehydration, and stripping. In general, these operations are carried out by having the natural gas contact a solvent.

In the case of gases highly charged with acid gases, a solvent combining a high physical capacity and a strong chemical affinity with the acid compounds to be absorbed is often used to bring the acid-compound content in the treated gas to a few ppm, as required by market specifications. The use of a solvent composed of water, alkanolamine, amine, or another basic compound, and an organic compound such as an alcohol, sulfolane, or any other strongly polar organic substance enables a high absorption capacity to be combined with strong chemical affinity between the solvent and the acid gases to be eliminated.

French Patent 2,636,857 proposes absorbing the acid gases with a solvent containing 50 to 100 wt. % methanol at a low temperature, between $-30°$ C. and $0°$ C. French Patent 2,743,083 performs the deacidification operation using a solvent composed of water, alkanolamine, and methanol. Absorption of the acid compounds is effected at temperatures between $40°$ C. and $80°$ C.

However, these processes are encumbered by solvent losses due to solvent saturation of the treated gas and mechanical entrainment of the solvent in the gas. The higher the vapor pressure of the solvent components, the greater these losses.

The present invention proposes a technique for recovering volatile components of a solvent entrained in the gas that has come from a deacidification unit.

In general, the present invention relates to a method for processing a natural gas containing acid compounds such as hydrogen sulfide and carbon dioxide, where the following step is taken:

a) the natural gas is brought into contact with a solvent that takes up the acid compounds so as to obtain a purified gas containing solvent as well as a solvent charged with acid compounds, b) the purified gas obtained in step a) is brought into contact with a non-aqueous ionic liquid so as to obtain a solvent-impoverished purified gas and an ionic liquid charged with solvent, the general formula of the ionic liquid being $Q^+ A^-$, where $Q^+$ designates an ammonium, phosphonium, and/or sulfonium cation, and $A^-$ designates an anion able to form a liquid salt.

According to the invention, the following step can also be carried out:

c) the ionic liquid charged with solvent is regenerated to recover both a solvent-impoverished ionic liquid and an effluent containing solvent.

According to the invention, in step c) the ionic liquid charged with solvent can be heated to evaporate the effluent containing solvent.

Before step a), the natural gas can be brought into contact with the effluent obtained in step c).

The solvent charged with acid compounds, obtained in step a), can be regenerated by expansion and/or by heating.

Before step b), the purified gas obtained in step a) can be cooled in order to condense some of the solvent.

The solvent can comprise at least one compound chosen from the glycols, ethers, glycol ethers, alcohols, sulfolane, N-methylpyrrolidone, propylene carbonate, ionic liquids, amines, alkanolamines, amino acids, amides, ureas, phosphates, carbonates, and alkaline metal borates. In addition, the solvent can be in an aqueous solution.

The $A^-$ anion can be chosen from groups comprising the following halide ions: nitrate, sulfate, phosphate, acetates, halogen acetate, tetrafluoroborate, tetrachloroborate, hexafluorophosphate, hexafluoroantimonate, fluorosulfonate, alkyl sulfonates, perfluoroalkyl sulfonates, bis(perfluoroalkyl sulfonyl) amides, tris-trifluoromethanesulfonyl methylide with formula $(C(CF_3SO_2)_3^-$, alkyl sulfates, arene sulfates, arene sulfonates, tetraalkyl borates, tetraphenyl borate, and tetraphenyl borates whose aromatic rings are substituted.

The $Q^+$ cation can have one of the following general formulas $[NR^1R^2R^3R^4]^+$, $[PR^1R^2R^3R^4]^+$, $[R^1R^2N=CR^3R^4]^+$, and $[R^1R^2P=CR^3R^4]^+$ where $R^1$, $R^2$, $R^3$, and $R^4$, which are identical or different, represent hydrogen or hydrocarbyl residues with 1 to 30 carbon atoms, except for the $NH_4^+$ cation for $[NR^1R^2R^3R^4]^+$.

The $Q^+$ cation can also be derived from the nitrogen-containing and/or phosphorus-containing heterocycle having 1, 2, or 3 nitrogen and/or phosphorus atoms, the heterocycle being comprised of 4 to 10 carbon atoms.

The $Q^+$ cation can also have one of the following general formulas: $R^1R^2N^+=CR^3-R^5-R^3C=N^+R^1R^2$ and $R^1R^2P^+=CR^3-R^5-R^3C=P^+R^1R^2$ where $R^1$, $R^2$, and $R^3$ represent hydrogen or a hydrocarbyl residue with 1 to 30 carbon atoms and where $R^5$ represents an alkylene or phenylene residue.

The $Q^+$ cation can be chosen from the group including N-butylpyridinium, N-ethylpyridinium, pyridinium, 1-methyl-3-ethyl-imidazolium, 1-methyl-3-butyl-imidazolium, 1-methyl-3-hexyl-imidazolium, 1,2-dimethyl-3-butyl-imidazolium, diethyl-pyrazolium, N-butyl-N-methylpyrrolidinium, trimethylphenylammonium, tetrabutylphosphonium, and tributyltetradecylphosphonium.

The $Q^+$ cation can also have the general formula $[SR^1R^2R^3]+$ where $R^1$, $R^2$, and $R^3$, which are identical or different, each represent a hydrocarbyl residue with 1 to 12 carbon atoms.

The ionic liquid can be chosen from the group comprising N-butyl-pyridinium hexafluorophosphate, N-ethyl-pyridinium tetrafluoroborate, pyridinium fluorosulfonate, 1-methyl-3-butyl-imidazolium tetrafluoroborate, 1-methyl-3-butyl-imidazolium bis-trifluoromethanesulfonyl amide, triethylsulfonium bis-trifluoromethanesulfonyl amide, 1-methyl-3-butyl-imidazolium hexafluoroantimonate, 1-methyl-3-butyl-imidazolium hexafluorophosphate, 1-methyl-3-butyl-imidazolium trifluoroacetate, 1-methyl-3-butyl-imidazolium trifluoromethylsulfonate, 1-methyl-3-butyl-imidazolium bis(trifluoromethylsulfonyl) amide, trimethylphenylammonium hexafluorophosphate, and tetrabutylphosphonium tetrafluoroborate.

Advantageously, the method according to the invention enables the volatile compounds in the solvent entrained by the deacidified gas to be recovered, and enables the deacidified gas to be dehydrated. The solvent is recovered at a high purity level, and this level may be compatible with recycling back to the process.

Other features and advantages of the invention will be better understood and appear clearly when reading the description hereinbelow with reference to FIG. 1 which shows the method according to the invention schematically and FIG. 2 which presents an improvement of the invention.

In FIG. 1, the natural gas to be processed arrives through pipe 1. The natural gas contains hydrocarbons, for example in proportions of between 50% and 99%, as well as acid compounds such as carbon dioxide ($CO_2$), hydrogen sulfide ($H_2S$), mercaptans, and carbonyl sulfide (COS), for example in proportions of between a few ppm and 50%. In addition, the natural gas can contain water.

A fraction of the natural gas can be introduced by pipe 2 into contacting zone C1, where it is brought into contact with an aqueous solution containing solvent, arriving through pipe 4. At the bottom of column C1, a substantially solvent-free aqueous phase is evacuated through pipe 3. At the head of column C1, a solvent-charged gas is evacuated through pipe 5, and this gas can be mixed with a second fraction of gas to be treated, arriving through pipe 6.

This gas mixture is sent through pipe 7 to column C2, in which it is brought into contact with a solvent arriving through pipe 8. In column C2, the solvent absorbs the acid compounds contained in the natural gas.

The solvents used in the present invention are absorption solutions comprising one or more organic solvents and/or one or more compounds having the ability to react reversibly with the acid gases ($CO_2$, $H_2S$, mercaptans, and COS) contained in the natural gas. The groups reacting with the acid gases can also be grafted onto the solvent or solvents. The solution used can contain water. The solvents can be glycols, glycol ethers, alcohols, sulfolane, N-methylpyrrolidone, propylene carbonate, or ionic liquids. The reactive compounds can be amines (primary, secondary, tertiary, cyclic or noncyclic, aromatic or nonaromatic), alkanolamines, amino acids, amides, ureas, phosphates, carbonates, or alkaline metal borates. The solution can also contain anticorrosion and/or antifoaming additives. The vapor pressure of the solution at 100° C. can advantageously be greater than 0.1 MPa, preferably greater than 0.2 MPa, and more preferably greater than 0.3 MPa. The absorption efficiency by the solvent increases as the molecules to be extracted have greater polarity or a higher dielectric constant.

The purified gas, i.e. impoverished in acid compounds, is evacuated from column C2 by pipe 9. This gas contains hydrocarbons (essentially methane and ethane), possibly water, and some of the solvent with which it was brought into contact. When contacting in C2 occurs, the hydrocarbons co-absorb and entrain solvent and possibly water.

The solvent charged with acid compounds is evacuated from column C2 through pipe 10, then introduced into regeneration zone R. Zone R separates the acid compounds from the solvent.

Zone R can carry out a series of expansions of the aqueous solution and/or temperature elevations, for example by distillation, of the solvent. The expansion and temperature rise allow the acid compounds absorbed by the solvent to be released in the form of a gaseous effluent. Upon regeneration, a quantity of solvent is also vaporized and entrained with the acid compounds. Thus, the gaseous effluent evacuated from zone R by pipe 11 has not only acid compounds, in a proportion that may be between 70% and 99%, but also solvent in a proportion that may be between a few ppm and 20%. Moreover, the gaseous effluent can include hydrocarbons co-absorbed by the solvent in column C2, and possibly water as well. The regenerated solvent, i.e. solvent impoverished in acid compounds, obtained after expansion and/or distillation, is evacuated from zone R by pipe 8, and can be introduced into column C2.

The purified gas containing solvent and possibly water, circulating in pipe 9, is introduced into absorption zone ZA where it is brought into contact with a non-aqueous ionic liquid arriving through pipe 13. In zone ZA, the solvent and possibly water that are contained in the gas arriving through pipe 9 are absorbed by the ionic liquid. The solvent-impoverished gas, and possibly water, i.e. solvent containing essentially hydrocarbons, is evacuated from zone ZA by pipe 17. Thus, in the case where the purified gas includes water, the method according to the present invention also has the advantage of dehydrating this gas. The ionic liquid charged with solvent and water is evacuated from zone ZA by pipe 16. Contacting can be effected under pressure, for example between 1 MPa and 10 MPa, and at a temperature between 20° C. and 100° C., preferably between 40° C. and 90° C.

The contacting in zone ZA can be accomplished in one or more co-current or counter-current washing columns, for example in plate columns of the perforated, valved, and/or cap type, or packed towers with bulk or structured packing. It is also possible to use contactors to effect the contact. The contactors can be of the static or the dynamic type, followed by decanting zones. A membrane contactor can also be used, in which the gaseous effluents flow on one side of a membrane, the ionic liquid flows on the other side of the membrane, and the material exchanges take place through the membrane.

By adapting zone ZA to the feedstock to be processed and adjusting the contacting temperature and pressure, it is possible to bring about selectivity to ensure capture of the solvent and possibly water by the ionic liquid, while minimizing co-absorption of hydrocarbons.

The non-aqueous ionic liquid used in the present invention is chosen from the group formed by liquid salts with the general formula $Q^+ A^-$, where $Q^+$ represents an ammonium, phosphonium, and/or sulfonium, and $A^-$ represents any organic or inorganic anion able to form a liquid salt at low temperature, namely below 100° C. and advantageously a maximum of 85° C., and preferably below 50° C.

In the non-aqueous ionic liquid with the formula $Q^+ A^-$, the $A^-$ anions are preferably chosen from the following halide anions: nitrate, sulfate, phosphate, acetates, halogen acetate, tetrafluoroborate, tetrachloroborate, hexafluorophosphate, hexafluoroantimonate, fluorosulfonate, alkyl sulfonates (for example methyl sulfonate), perfluoroalkyl sulfonates (for example trifluoromethyl sulfonate), bis(perfluoroalkyl sulfonyl) amides (for example bis-trifluoromethane sulfonyl amide with formula $N(CF_3SO_2)_2^-$), tris-trifluoromethane-sulfonyl methylide with formula ($C(CF_3SO_2)_3^-$, arene sulfonates, possibly substituted by halogen or halogen alkyl groups, as well as the tetraphenylborate anion and tetraphenylborate anions whose aromatic rings are substituted.

The $Q^+$ cations are preferably chosen from the phosphonium, ammonium, and/or sulfonium group.

The ammonium and/or phosphonium $Q^+$ cations preferably have one of the general formulas $[NR^1R^2R^3R^4]^+$ and $[PR^1R^2R^3R^4]^+$, or one of the general formulas $[R^1R^2N=CR^3R^4]^+$, and $[R^1R^2P=CR^3R^4]^+$ wherein $R^1$, $R^2$, and $R^4$ which are identical or different, each represent hydrogen (with the exception of the $NH_4^+$ cation for $[NR^1R^2R^3R^4]^+$), preferably a single substituent representing hydrogen, or hydrocarbyl residues with 1 to 30 carbon atoms, for example alkyl groups, saturated or nonsaturated, cycloalkyl, or aromatic, aryl or aralkyl, possibly substituted, with 1 to 30 carbon atoms.

The ammonium and/or phosphonium cations can also be derived from nitrogen-containing and/or phosphorus-containing heterocycles having 1, 2, or 3 nitrogen and/or phosphorus atoms, with the general formulas:

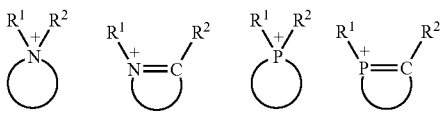

wherein the cycles are comprised of 4 to 10 atoms, preferably 5 to 6 atoms, and $R^1$ and $R^2$ are defined as above.

The ammonium or phosphonium cation can also have one of the following general formulas:

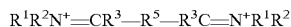

and

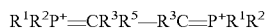

wherein $R^1$, $R^2$, and $R^3$, which are identical or different, are defined as above and $R^5$ represents an alkylene or phenyl group. Of the $R^1$, $R^2$, $R^3$, and $R^4$ groups, the methyl, ethyl, propyl, isopropyl, secondary butyl, tertiary butyl, butyl, amyl, phenyl, or benzyl radicals may be mentioned; $R^5$ can be a methylene, ethylene, propylene, or phenylene group.

The ammonium and/or phosphonium cation $Q^+$ is preferably chosen from the group formed by N-butylpyridinium, N-ethylpyridinium, pyridinium, 1-methyl-3-ethyl-imidazolium, 1-methyl-3-butyl-imidazolium, 1-methyl-3-hexyl-imidazolium, 1,2-dimethyl-3-butyl-imidazolium, diethyl-pyrazolium, N-butyl-N-methylpyrrolidinium, trimethylphenylammonium, tetrabutylphosphonium, and tributyltetradecylphosphonium.

The sulfonium cations $Q^+$ can have the general formula $[SR^1R^2R^3]^+$, where $R^1$, $R^2$, and $R^3$, which are identical or different, each represent a hydrocarbyl residue with 1 to 12 carbon atoms, for example an alkyl group, saturated or non-saturated, or cycloalkyl or aromatic, aryl, alkaryl, or aralkyl group having 1 to 12 carbon atoms.

The following salts usable according to the invention may be cited as examples: N-butyl-pyridinium hexafluorophosphate, N-ethyl-pyridinium tetrafluoroborate, pyridinium fluorosulfonate, 1-methyl-3-butyl-imidazolium tetrafluoroborate, 1-methyl-3-butyl-imidazolium bis-trifluoromethanesulfonyl amide, triethylsulfonium bis-trifluoromethanesulfonyl amide, 1-methyl-3-butyl-imidazolium hexafluoroantimonate, 1-methyl-3-butyl-imidazolium hexafluorophosphate, 1-methyl-3-butyl-imidazolium trifluoroacetate, 1-methyl-3-butyl-imidazolium trifluoromethylsulfonate, 1-methyl-3-butyl-imidazolium bis(trifluoromethylsulfonyl) amide, trimethylphenylammonium hexafluorophosphate, and tetrabutylphosphonium tetrafluoroborate. These salts can be used singly or mixed.

The ionic liquid circulating in pipe 16 is regenerated by separating the ionic liquid from the solvent and possibly water. Various techniques can be used to effect this regeneration.

According to a first technique, the ionic liquid circulating in pipe 16 is regenerated by precipitating the ionic liquid by cooling and/or pressure drop, then separating the liquid solvent from the precipitated ionic liquid.

According to a second technique, the ionic liquid circulating in pipe 16 is regenerated by a technique usually known as stripping. The solvent-charged ionic liquid is brought into contact with a fluid such that the fluid entrains the solvent. For example, the solvent-charged ionic liquid is brought into contact with the natural gas before processing. Thus, the natural gas entrains the solvent and the ionic liquid is solvent-impoverished.

According to a third technique illustrated in FIG. 1, recovery of the solvent absorbed by the ionic liquid circulating in pipe 16 is accomplished by evaporating the solvent. The solvent-charged ionic liquid can be expanded by expansion device V1 (expansion valve and/or turbine), possibly introduced into a separating drum to release the components vaporized upon expansion, and can then be heated in the heat exchanger E1. Finally, the ionic liquid is introduced into evaporation device DE.

Evaporator DE enables the solvent to be separated from the ionic liquid. In evaporator DE, the ionic liquid is heated in a reboiler to a sufficient temperature to evaporate the solvent and possibly water. The ionic liquid can be introduced into evaporator DE such that it comes in contact with the evaporated solvent and water. The thermodynamic conditions (pressure and temperature) of evaporation are to be determined by the individual skilled in the art according to the financial considerations specific to each case. For example, evaporation can be carried out at a pressure of between 0.005 MPa and 3 MPa, and at the corresponding temperature for solvent evaporation. When the solvent is a glycol such as MEG or DEG, the temperature can be between 135° C. and 180° C. for a pressure of between 0.005 MPa and 0.1 MPa. When the solvent is methanol, the evaporation temperature can be between 10° C. and 140°VC for a pressure between 0.01 MPa and 1 MPa. The heat stability of the ionic liquids allows a very broad temperature range to be used. The evaporated solvent is evacuated from evaporator DE through pipe 14. The gas circulating in pipe 14 is condensed by cooling in the heat exchanger E2, then introduced into drum B1. The elements that are not condensed are evacuated at the head of drum B1. The condensates recovered from the bottom of drum B1 constitute the solvent extracted from the natural gas circulating in pipe 9. Some of the condensates recovered at the bottom of drum B1 can be refluxed through pipe 15 into evaporator DE. A second portion of the condensates recovered at the bottom of drum B1 can be recycled. For example, this second part circulating in pipe 18 is pumped by pump P1, then introduced through pipe 4 into column C1.

The regenerated ionic liquid, i.e. liquid containing little or no solvent, is evacuated as a liquid from evaporator DE through pipe 12. The regenerated ionic liquid can be cooled in heat exchanger E1, pumped by pump P2, then introduced through pipe 13 into absorption zone ZA.

For example, evaporator DE can be a distillation column with three to ten plates, preferably supplemented by two boiler plates.

The pressure and temperature conditions under which evaporation takes place in evaporator DE can be selected so as to enable any hydrocarbon traces, co-absorbed by the liquid in zone ZA, to remain in the regenerated ionic liquid sent to zone ZA.

The following numerical example illustrates the method according to the invention described with reference to FIG. 1.

The natural gas is brought into contact, in column C2, with a solvent containing 50 wt. % water, 30 wt. % diethanolamine, and 20 wt. % methanol. The deacidified gas is obtained at the head of column C2 at 45° C. and 7 Mpa. It circulates in pipe 9 at a rate of 10,000 kmol/h, and contains 0.4 vol. % methanol, 0.02 vol. % water, 72 vol. % methane, 14 vol. % ethane, and 13.4 vol. % hydrocarbons containing more than three carbon atoms and a few ppm of $CO_2$ and $H_2S$. The acid-compound content of the processed gas does not however interfere with the efficiency of the method according to the invention for recovering solvent entrained with the gas, i.e. methanol and water in this example.

The contacting in ZA of the gas with an ionic liquid, 1-butyl-3-methylimidazolium bis(trifluoromethylsulfonyl)amide (BMIM) (TF2N), enables the methanol and water contained in the deacidified gas to be recovered.

An ionic liquid flowrate of 30 m³/h in ZA allows 95% of the methanol contained in the gas to be recovered, using a gas-liquid contactor developing an efficiency equivalent to three theoretical stages. By using a contactor developing an efficiency equivalent to six theoretical stages, the methanol content of the processed gas is approximately 10 ppm mol.

A flowrate of 60 m³/h of ionic liquid yields a processed gas containing approximately 10 ppm mol of methanol, using a contactor developing an efficiency equivalent to four theoretical stages.

The operating conditions according to the example also enable efficient dehydration of natural gas to be carried out.

FIG. 2 shows an improvement in the method described in reference to FIG. 1. The reference numerals in FIG. 2 that are identical to those in FIG. 1 designate the same elements.

The purified gas circulating in pipe 9 also contains hydrocarbons, solvent, and possibly water. This gas is partially condensed by cooling in heat exchanger E3, for example at a temperature of between −40° C. and 0° C., then introduced into separating drum B2. The condensates essentially containing solvent are evacuated from drum B2 through pipe 20. The gas phase obtained at the head of drum B2 is heated in heat exchanger E4, then introduced into absorption zone ZA.

The improvement described with reference to FIG. 2 enables some of the solvent contained in the effluent circulating in pipe 5 to be extracted by cooling, and hence reduces the flowrate of ionic liquid necessary to capture the solvent in zone ZA.

The invention claimed is:

1. Method for processing a natural gas containing acid compounds such as hydrogen sulfide and carbon dioxide, comprising the following steps:
   a) bringing the natural gas into contact with a solvent that takes up the acid compounds so as to obtain a purified gas containing solvent as well as a solvent charged with acid compounds,
   b) bringing the purified gas obtained in step a) into contact with a non-aqueous ionic liquid so as to obtain a solvent-impoverished purified gas and an ionic liquid charged with solvent, the general formula of the ionic liquid being $Q^+ A^-$, where $Q^+$ designates an ammonium, phosphonium, and/or sulfonium cation, and $A^-$ designates an anion able to form a liquid salt, and
   c) regenerating the solvent charged with acid compounds, obtained in step a), by expansion and/or by heating.

2. Method according to claim 1, further comprising the following step:
   d) the solvent-charged ionic liquid is regenerated to recover a solvent-impoverished ionic liquid as well as an effluent containing solvent.

3. Method according to claim 2, wherein, in step d) the solvent-charged ionic liquid is heated to evaporate the effluent containing solvent.

4. Method according to claim 2, wherein, before step a), the natural gas is brought into contact with the effluent obtained in step d).

5. Method according to claim 1, wherein, before step b), the purified gas obtained in step a) is cooled to condense some of the solvent.

6. Method according to claim 1, wherein the solvent has at least one compound chosen from the glycols, ethers, glycol ethers, alcohols, sulfolane, N-methylpyrrolidone, propylene carbonate, ionic liquids, amines, alkanolamines, amino acids, amides, ureas, phosphates, carbonates, and alkaline metal borates.

7. Method according to claim 6, wherein the solvent is in aqueous solution.

8. Method according to claim 1, wherein the $A^-$ anion is chosen from groups comprising the following halide ions: nitrate, sulfate, phosphate, acetates, halogen acetates, tetrafluoroborate, tetrachloroborate, hexafluorophosphate, hexafluoroantimonate, fluorosulfonate, alkyl sulfonates, perfluoroalkyl sulfonates, bis(perfluoroalkyl sulfonyl) amides, tris-trifluoromethanesulfonyl methylide with formula $(C(CF_3SO_2)_3)^-$, arene sulfonates, tetraphenyl borate, and tetraphenyl borates whose aromatic rings are substituted.

9. Method according to claim 1, wherein the $Q^+$ cation has one of the following general formulas $[NR^1R^2R^3R^4]^+$, $[PR^1R^2R^3R^4]^+$, $[R^1R^2N\!=\!CR^3R^4]^+$, and $[R^1R^2P\!=\!CR^3R^4]^+$ where $R^1, R^2, R^3$, and $R^4$ represent hydrogen or a hydrocarbyl with 1 to 30 carbon atoms, except for the $NH_4^+$ cation for $[NR^1R^2R^3R^4]^+$.

10. Method according to claim 1, wherein the $Q^+$ cation is derived from the nitrogen-containing and/or phosphorus-containing heterocycle having 1, 2, or 3 nitrogen and/or phosphorus atoms, the heterocycle being comprised of 4 to 10 carbon atoms.

11. Method according to claim 1, wherein the $Q^+$ cation has one of the following general formulas: $R^1\ R^2N^+\!=\!CR^3\!-\!R^5\!-\!R^3C\!=\!N^+R^1R^2$ and $R^1R^2P^+\!=\!CR^3\ R^5\!-\!R^3C\!=\!P^+R^1R^2$
   where $R^1, R^2$, and $R^3$ represent hydrogen or a hydrocarbyl with 1 to 30 carbon atoms and where $R^5$ represents an alkylene or phenylene residue.

12. Method according to claim 1, wherein the $Q^+$ cation is chosen from the group including N-butylpyridinium, N-ethylpyridinium, pyridinium, 1-methyl-3-ethyl-imidazolium, 1-methyl-3-butyl-imidazolium, 1-methyl-3-hexyl-imidazolium, 1,2-dimethyl-3-butyl-imidazolium, diethyl-pyrazolium, N-butyl-N-methylpyrrolidinium, trimethylphenylammonium, tetrabutylphosphonium, and tributyltetradecylphosphonium.

13. Method according to claim 1, wherein the $Q^+$ cation has the general formula $[SR^1\ R^2R^3]+$ where $R^1, R^2$, and $R^3$ each represent a hydrocarbyl residue with 1 to 12 carbon atoms.

14. Method according to claim 1, wherein the ionic liquid is chosen from the group comprising N-butyl-pyridinium hexafluorophosphate, N-ethyl-pyridinium tetrafluoroborate, pyridinium fluorosulfonate, 1-methyl-3-butyl-imidazolium tetrafluoroborate, 1-methyl-3-butyl-imidazolium bis-trifluoromethanesulfonyl amide, triethylsulfonium bis-trifluoromethanesulfonyl amide, 1-methyl-3-butyl-imidazolium hexafluoroantimonate, 1-methyl-3-butyl-imidazolium hexafluorophosphate, 1-methyl-3-butyl-imidazolium trifluoroacetate, 1-methyl-3-butyl-imidazolium trifluoromethylsulfonate, 1-methyl-3-butyl-imidazolium bis(trifluoromethylsulfonyl) amide, trimethylphenylammonium hexafluorophosphate, and tetrabutylphosphonium tetrafluoroborate.

* * * * *